US012794863B2

(12) United States Patent
Kann et al.

(10) Patent No.: US 12,794,863 B2
(45) Date of Patent: Nov. 10, 2026

(54) SECURED PROXY DATA DISTRIBUTION

(71) Applicant: Itron, Inc., Liberty Lake, WA (US)

(72) Inventors: James Lee Kann, Mica, WA (US); Karen Livingston, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 43 days.

(21) Appl. No.: 18/932,425

(22) Filed: Oct. 30, 2024

(65) Prior Publication Data

US 2026/0052129 A1 Feb. 19, 2026

Related U.S. Application Data

(60) Provisional application No. 63/683,607, filed on Aug. 15, 2024.

(51) Int. Cl.
*H04L 29/06* (2006.01)
*G06F 8/65* (2018.01)
*H04L 9/40* (2022.01)

(52) U.S. Cl.
CPC ............ *H04L 63/0428* (2013.01); *G06F 8/65* (2013.01)

(58) Field of Classification Search
CPC ............................... H04L 63/0428; G06F 8/65
See application file for complete search history.

(56) References Cited

U.S. PATENT DOCUMENTS 11,360,762 B2 * 6/2022 Teraoka .................. G06F 8/658
2015/0245182 A1 * 8/2015 Scagnol ............. G06Q 10/0833 370/312
2017/0093985 A1 * 3/2017 Kouno .................. H04L 67/141
2018/0262593 A1 9/2018 Osterloh et al.

(Continued)

FOREIGN PATENT DOCUMENTS

WO WO-2019222319 A1 * 11/2019 ............... H04L 9/14

OTHER PUBLICATIONS

Porambage et al., "Proxy-based end-to-end key establishment protocol for the Internet of Things," 2015 IEEE International Conference on Communication Workshop (ICCW), London, UK, pp. 2677-2682 (Year: 2015).*

(Continued)

*Primary Examiner* — Morshed Mehedi
(74) *Attorney, Agent, or Firm* — Lee & Hayes, P.C.

(57) ABSTRACT

The disclosure describes techniques for distributing large amounts of data to networked devices. A utility company server sends data to proxy device(s) (e.g., a plurality of data collecting/distributing devices), each of which sends the data to a number of proxied devices (e.g., smart utility meters). Accordingly, the utility company server utilizes a plurality of proxy devices to lessen device workload and network bandwidth consumption. The proxy devices each "manage" a plurality of proxied devices. Advantageously, the techniques provide end-to-end security of the data, avoid devotion of significant network bandwidth to repetitive transmissions, and in some installations reduce battery power consumption. The systems, devices, and techniques for distributing large amounts of data to networked devices may be configured to include: software defined on central office server(s); a plurality of proxy devices associated with each server; and a plurality of proxied devices (e.g., smart metering devices) associated with each proxy device.

20 Claims, 7 Drawing Sheets

(56) References Cited

U.S. PATENT DOCUMENTS

| | | | | |
|---|---|---|---|---|
| 2019/0228144 | A1* | 7/2019 | Kermes | H04L 63/0861 |
| 2020/0236152 | A1* | 7/2020 | Bradley | H04N 21/25808 |
| 2023/0153099 | A1* | 5/2023 | Ujiie | H04L 12/40006<br>717/174 |

OTHER PUBLICATIONS

Kim et al., "Resilient end-to-end message protection for large-scale cyber-physical system communications," 2012 IEEE Third International Conference on Smart Grid Communications (SmartGridComm), Tainan, Taiwan, pp. 193-198 (Year: 2012).*

Search Report and Written Opinion for International Application No. PCT/US25/35992, Dated Sep. 16, 2025, 15 pages.

Tonyali, et al., "An Attribute-based Reliable Multicast-over-Broadcast protocol for firmware updates in smart meter networks", IEEE Conference on Computer Communications Workshops, May 1, 2017, pp. 97-102.

* cited by examiner

SECURED PROXY DATA DISTRIBUTION

RELATED APPLICATIONS

This patent application claims benefit of priority to U.S. patent application Ser. No. 63/683,607, having title "Secured Proxy Data Distribution", filed on Aug. 15, 2024, which is incorporated herein by reference.

BACKGROUND

In some networked environments, data must be transmitted to a large number of networked devices. This is particularly burdensome on the network when the data files are large "image" files or configuration scripts. The data files may include files such as upgraded software, firmware, operating systems, applications, etc. Such large files can create huge network bandwidth demands. Moreover, the repetitive nature of such transmissions is made more complex and burdensome to a network when end-to-end security is required. In the example of the utility industry, hundreds of thousands or even millions of networked devices are involved in the supply, delivery, and/or measurement of commodities (e.g., electricity, gas, water, etc.). In particular, consumption data is financially sensitive. Accordingly, metering devices must operate the correct software and transmit the correct meter readings. Network penetration or "hacking" can result in intentional software alteration by a bad actor. Additionally, the compromised software may result in the transmission of incorrect data and financially-related information.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for distributing large amounts of data to networked devices. A utility company server (or any cloud computer) sends data to a number of proxy device(s) (e.g., a plurality of data collecting/distributing devices), each of which sends the data to a number of proxied devices (e.g., a plurality of smart utility meters). Accordingly, the utility company server utilizes a plurality of proxy devices to lessen device workload and network bandwidth consumption. The proxy devices each "manage" a plurality of proxied devices, which tend to be geographically nearby. Advantageously, the techniques (including those performed by proxy devices and proxied devices) provide for end-to-end security for the data, avoid devotion of significant network bandwidth to repetitive transmissions, and in some installations reduce battery power consumption (e.g., in natural gas or water delivery systems).

The systems, devices, and techniques for distributing large amounts of data to networked devices may be configured to include software defined on: central office (or "cloud") server(s); a plurality of proxy devices (e.g., data collector and/or distribution devices) associated with each server; and a plurality of proxied devices (e.g., smart metering devices) associated with each proxy device. The coordinated operation of these devices can particularly be seen and understood by reference to FIGS. 4 through 6.

Example System and Techniques

Figure 1:
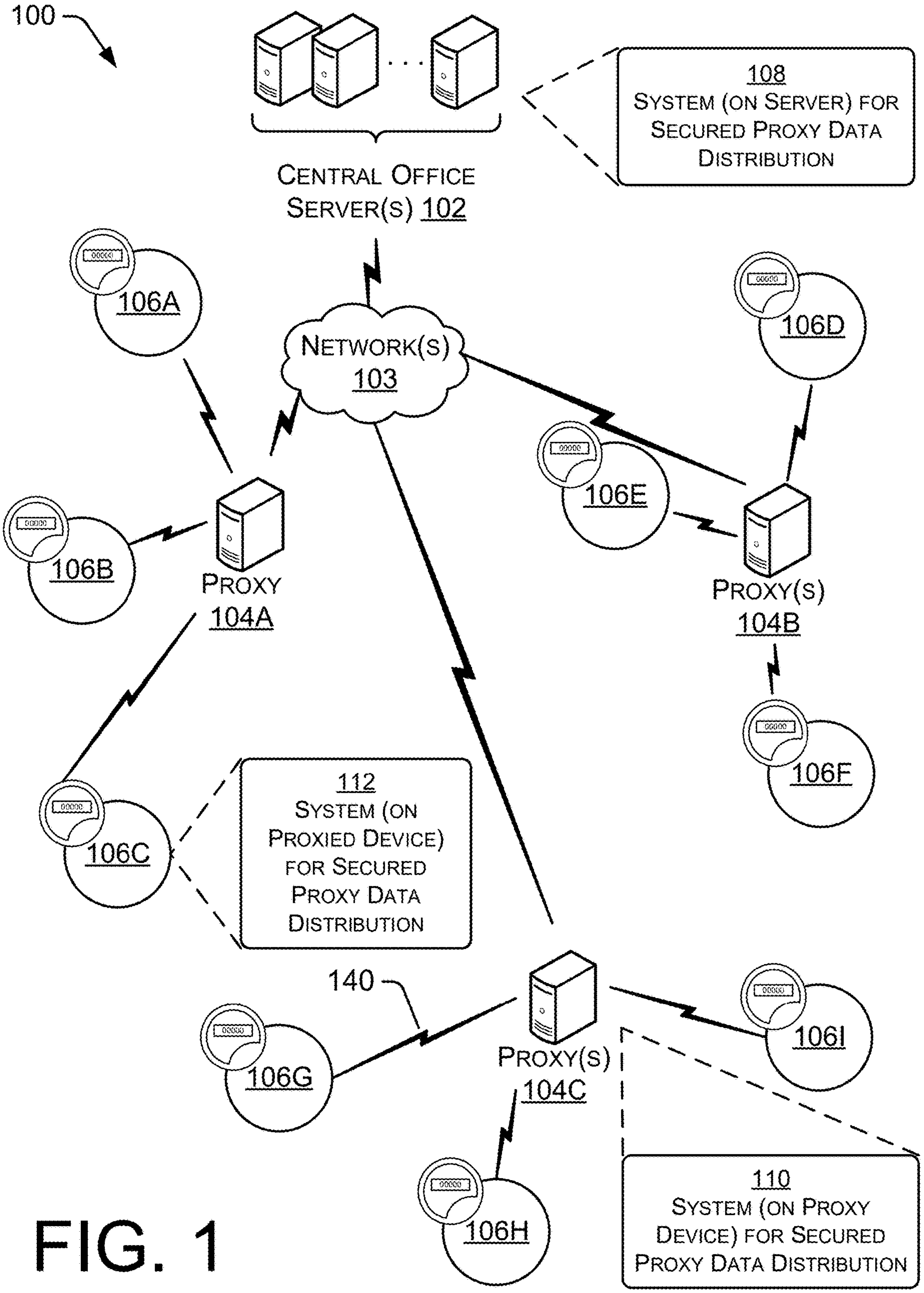
FIG. 1 is a block diagram showing an example utility network, configured for secured proxy data distribution.

FIG. 1 shows aspects of an example electricity grid 100, showing an example system configured for secured proxy data distribution. The system may be implemented in a distributed manner, with portions of the system residing on: the server(s) 102 (e.g., at a central office) or similar device; on a proxy device 104 (e.g., a data collector and/or distributor or other device); and a proxied device 106 (e.g., a smart utility meter).

The example electricity grid 100 includes central office computers and/or server(s) 102 (e.g., cloud computing device(s)) and networks 103. The networks 103 may include one or more of the internet, utility company proprietary network(s) using radio, powerline communications (PLC), mesh networks, star networks, etc.

Proxy devices 104 (e.g., computing devices A through C) may represent thousands, hundreds of thousands, or more such devices.

The proxied device(s) 106 A through I (e.g., smart utility meter) serve respective customer sites, and are representative of many such meters and sites, which may number in the thousands or hundreds of thousands. In the example shown, the meter is a smart meter and is in communication with the central office server(s) 102 through the network 103.

Figure 4:
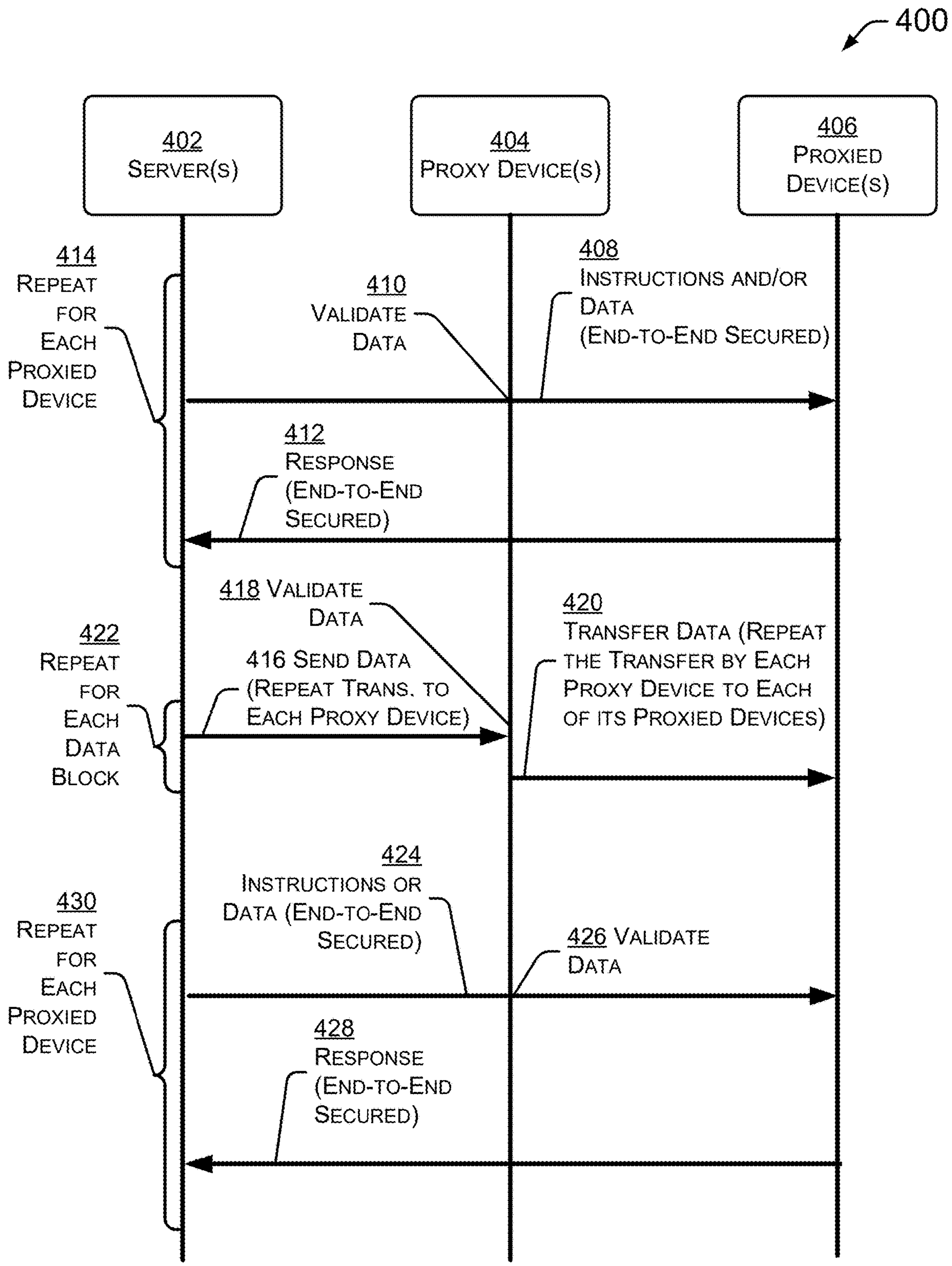
FIG. 4 is a sequence diagram showing an example relationship between server(s), proxy device(s), and proxied device(s), configured to provide secured proxy data distribution.
Figure 5:
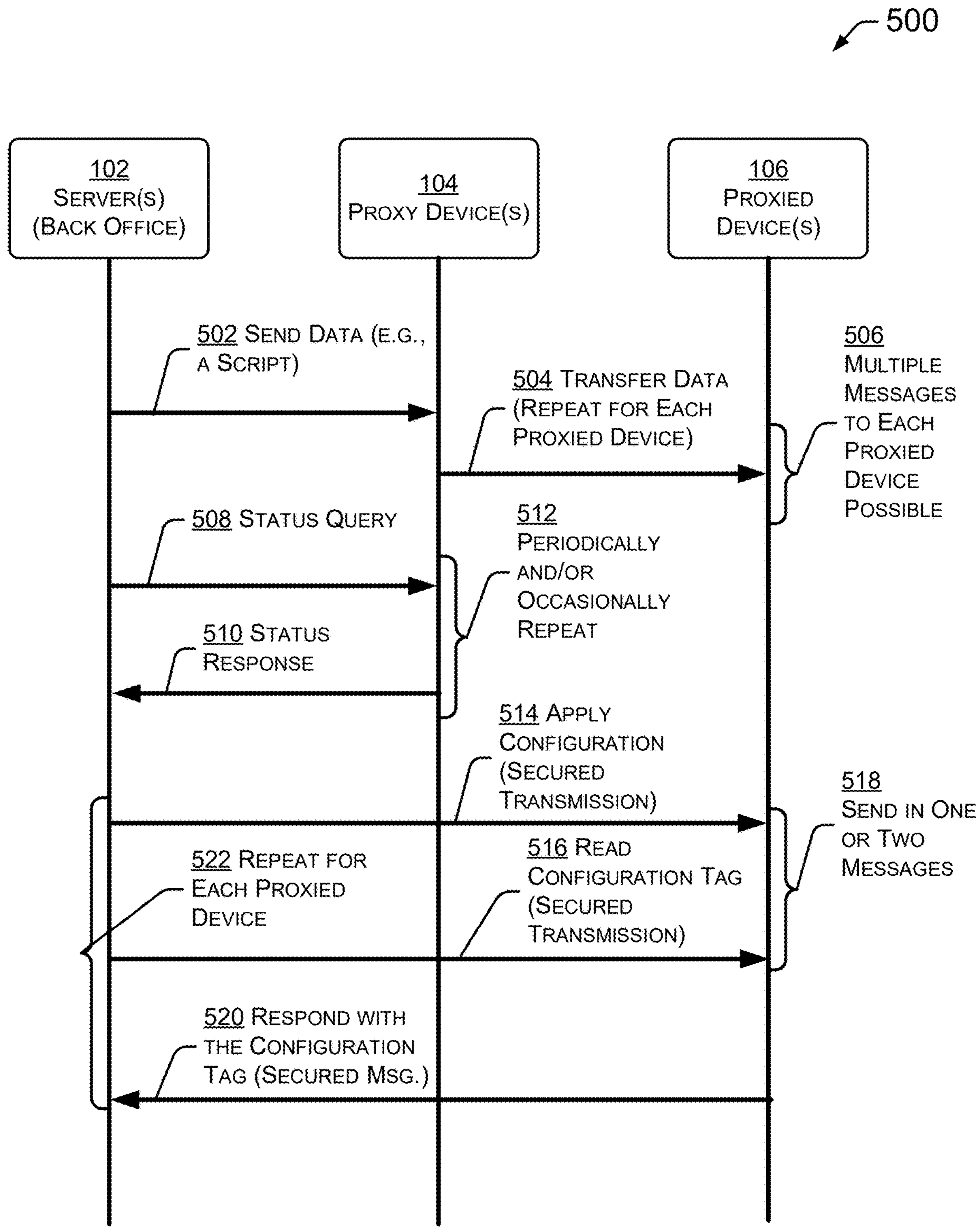
FIG. 5 is a sequence diagram showing an example relationship between server(s), proxy device(s), and proxied device(s), configured to perform secured transmission of respective configuration files (e.g., settings, device programming, etc.) to a large number of proxied devices.
Figure 6:
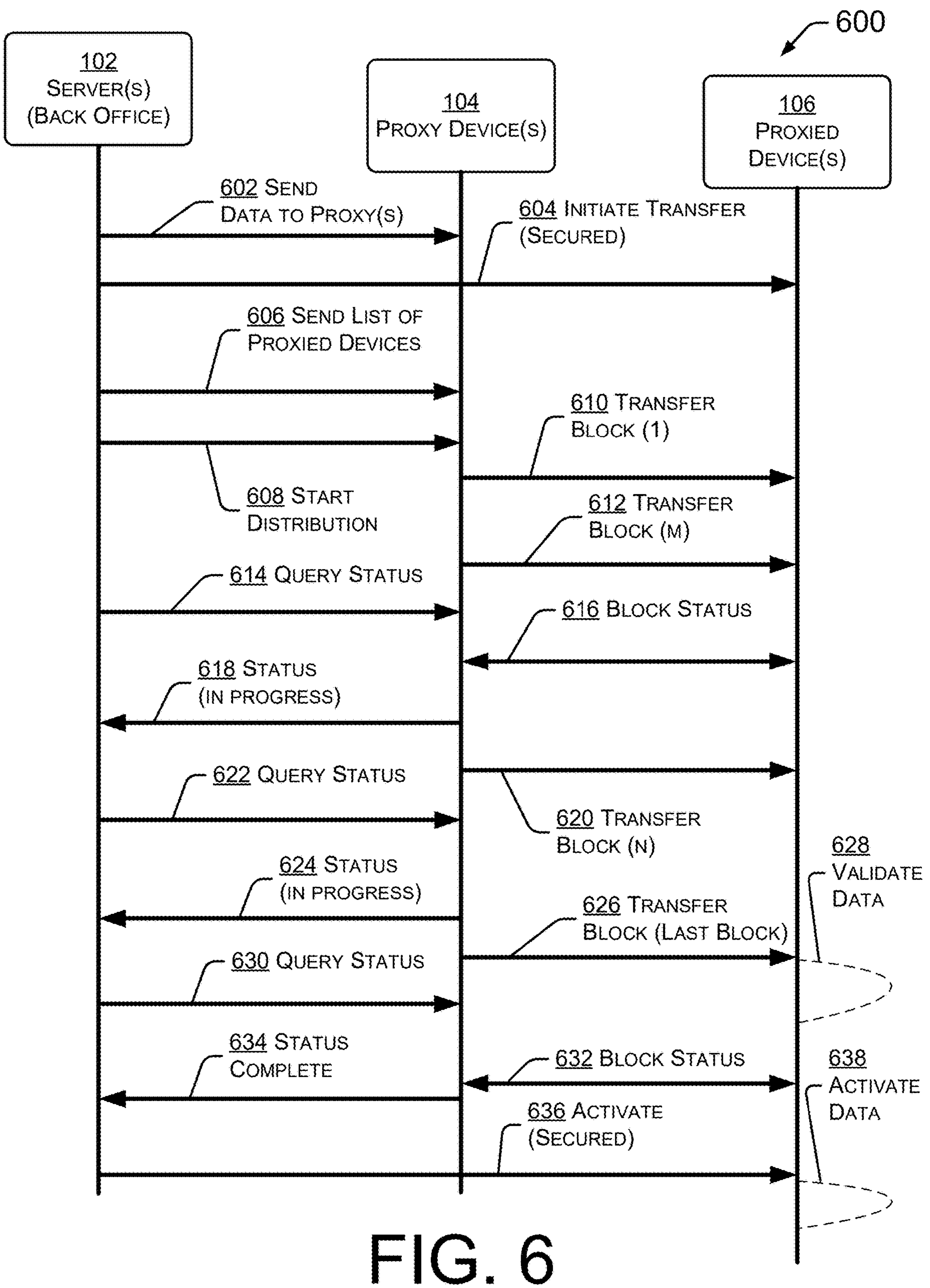
FIG. 6 is a sequence diagram showing an example relationship between server(s), proxy device(s), and proxied device(s), configured to perform secured transmission of respective "image" files (e.g., firmware, operating system, and/or application upgrades) to a large number of proxied devices.

A system for secured proxy data distribution may be configured to include portions of the system 108 on the server(s) 102, portions of the system 110 on a proxy device, and portions of the system 112 on a proxied device 106 (e.g., smart utility meter). In an example, the systems 108, 110, 112 may be applications, wherein each application is configured to communicate with the other two. Relationships between the server(s), proxy device(s), and proxied device(s) are seen in FIGS. 4-6.

Figure 2:
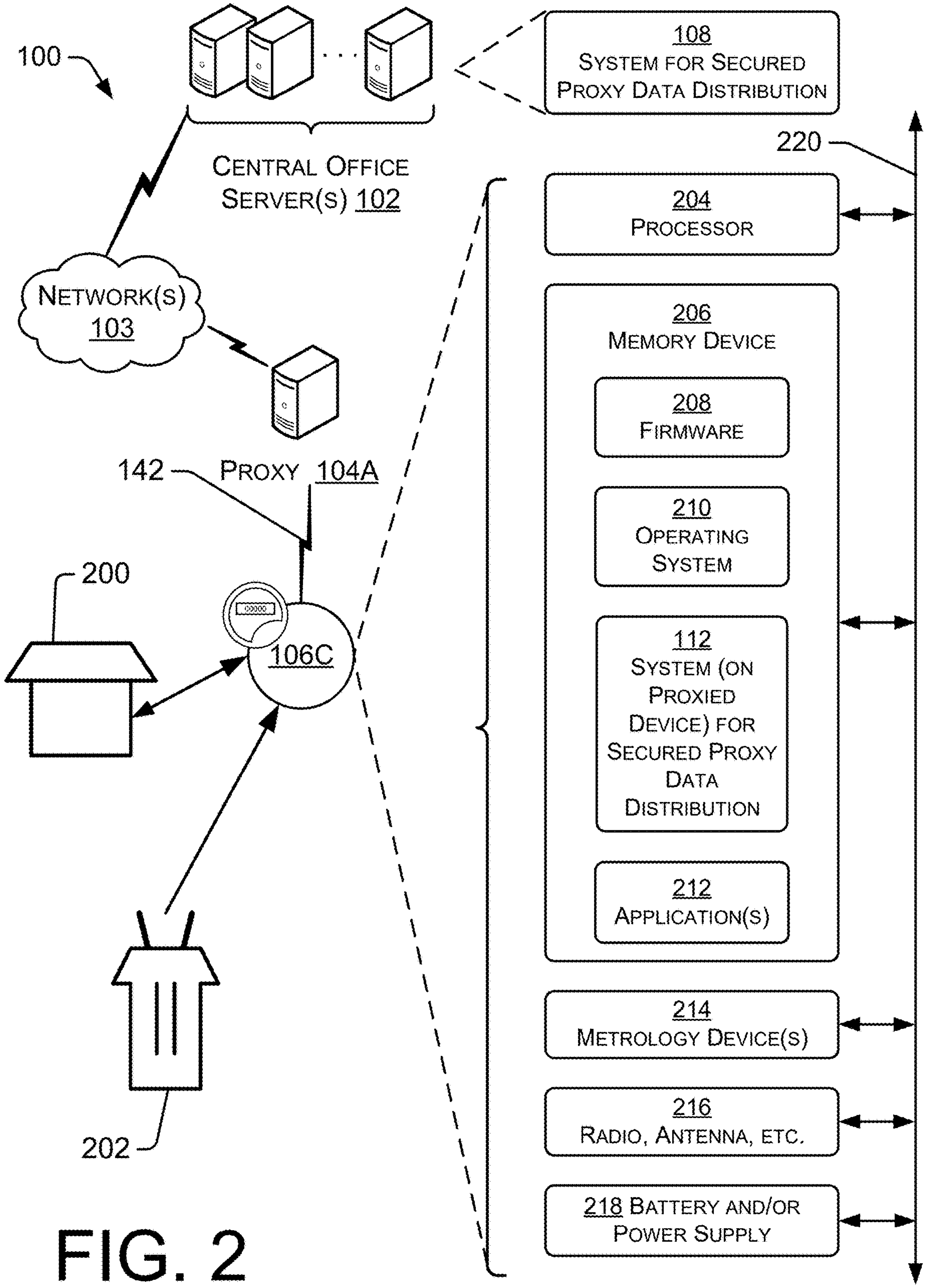
FIG. 2 is a block diagram showing example elements of a smart meter, configured as a proxied device.

FIG. 2 shows a second view of the example electricity grid 100, and added detail of a the proxied device 106C, configured to act as a proxied device (e.g., a device "managed" by a proxy), within a system for secured proxy data distribution.

In the example shown, the proxied device 106C (e.g., a smart utility meter) measures electricity consumption of a customer site 200. A transformer 202 provides low-voltage current to the proxied device 106C and customer site 200. The proxied device 106C includes a processor 204 and memory device(s) 206. The memory device(s) 206 may include software programs, that when executed by the processor 204, perform useful functions. In the example of FIG. 2, firmware 208, an operating system 210, and software applications 212 are shown. The proxied device 106C may include metrology device(s) 214, which may measure consumption of a commodity, such as electricity, natural gas, or water. The proxied device 106C may include a radio 216 and associated antenna. Alternatively, the smart meter may include a PLC modem or other communications device. The proxied device 106C may also include a battery and/or a power supply 218. In the example of a system configured as an electricity grid, a battery is not required. A power supply is configured to provide regulated direct current (DC) power at prescribed voltage levels for operation of the processor 204, the memory device(s) 206, the metrology device(s) 214, the radio 216, and/or other devices. A bus, printed circuit board, wiring harness, and/or other circuit connectivity device(s) 220 may be used to connect the processor 204, the memory device 206, the metrology device(s) 214, the radio 216, and the power supply 218. The system 112 for secured proxy data distribution enables the proxied device 106C to function as a proxied device (e.g., as described in FIGS. 4 through 6).

Figure 3:
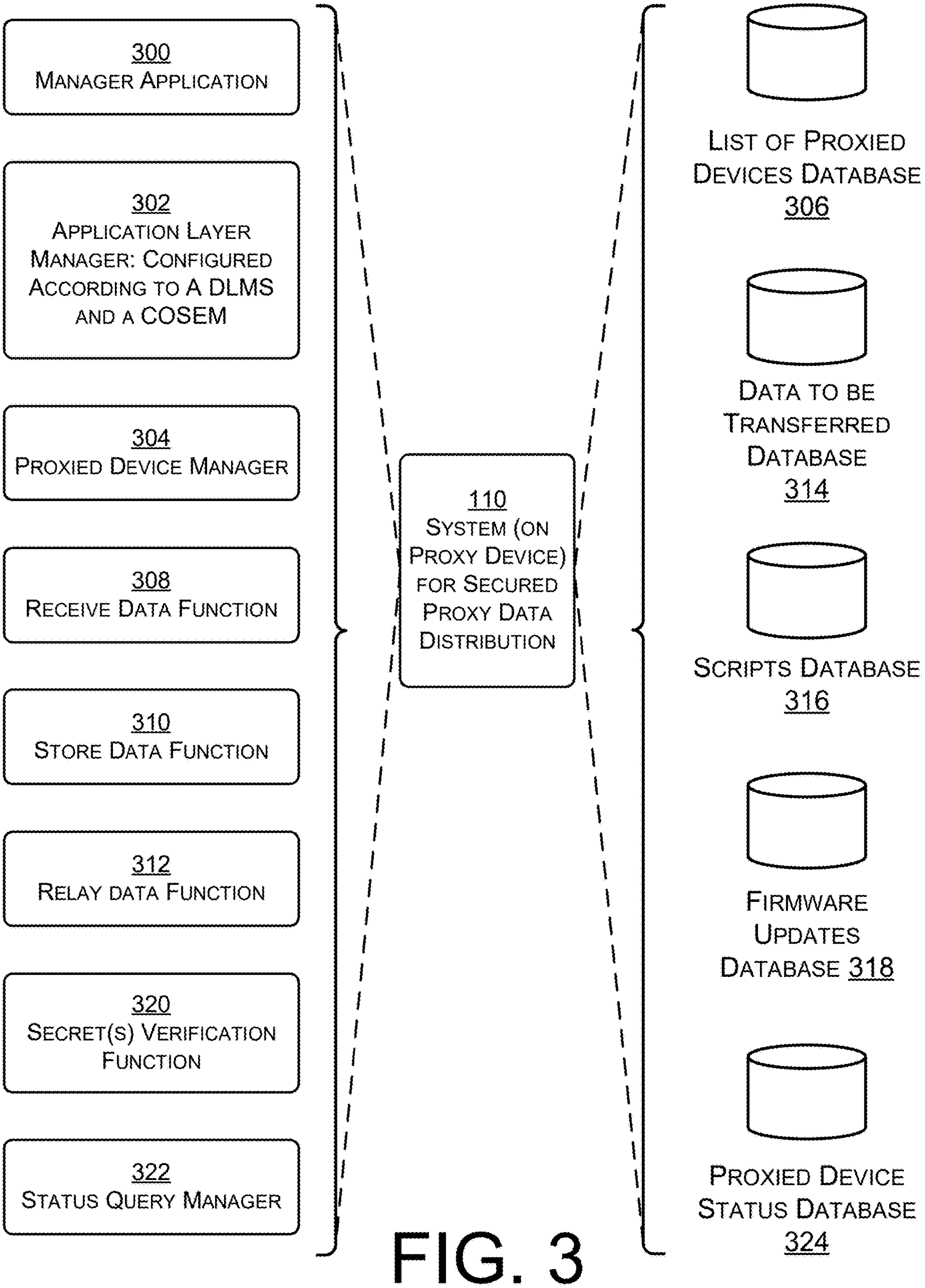
FIG. 3 is a block diagram showing example elements of a proxy device.

FIG. 3 shows example elements of the system 110 for secured proxy data distribution operable on a proxy device. The system 110 operates on the proxy device 104C (first shown in FIG. 1), which may be a data collector or distributor or other computing device on the network 103. FIG. 3 shows a number of applications, functions, and/or subroutines that are described as examples only. The actual arrangement, configuration, and/or implementation of the functionality of the system 110 for secured proxy data distribution may be made according to design requirements of a particular project. However, the discussion of FIG. 3 provides an example implementation from which a particular implementation may be derived.

A manager application 300 may coordinate the operation of various other applications, functions, and/or subroutines. An application layer manager 302 is configured according to a device language message specification (DLMS) and a companion specification for energy metering (COSEM). The manager application 300 and the application layer manager 302 may be merged into a single application in some instances.

A proxied device manager 304 allows the proxy device to keep track of the proxied devices it manages, their network addresses, their statuses, etc. In an example, the proxied device manager 304 manages a list or database 306 of the proxied devices.

A receive data function 308, a store data function 310, and a relay data function 312 allow the proxy device to manage incoming and outgoing data. In examples, a general database 314 may be used to store any type of data to be sent to proxied devices (e.g., as seen in FIG. 4). A scripts database 316 may be used to store scripts, which are useful in configurating a device (e.g., as seen in FIG. 5). A firmware updates database 318 may be used to store firmware updates for proxied devices (e.g., as seen in FIG. 6).

A secrets verification function 320 is configured to verify the identity of a server sending data to the proxy device, and to thereby prevent invalid malicious data from being sent to the proxied devices. In an example, the secret may be a signature of the server sending the data. The signature may have been created by the private key of the server. The signature may be read by, and verified by, the secrets verification function 320 of the proxy device using the server's public key.

A status query manager 322 is configured to request status from proxied devices at intervals, on occasion, as needed, and/or when requested by the server. The status query manager 322 may also be configured to respond to a status report (e.g., completions, failures, etc.) sent unprompted by proxied devices. The response may be to send the status to the server and/or to enter the status in a proxied device status database 324.

Example Secured Proxy Data Distribution Operations Sequences

FIG. 4 shows a sequence diagram 400 of events and/or actions, comprising a first example relationship between server(s) 402, proxy device(s) 404, and proxied device(s) 406, configured to provide secured proxy data distribution. The server(s), proxy device(s) 404, and proxied device(s) 406 may be configured in the network environment(s) of FIGS. 1-3, or may be configured in any network and may describe relationships between devices from among the internet of things. The relationship between the devices is described in part by the events of the sequence diagram 400. In the sequence diagram 400, a server 402 sends data to each of a plurality of proxy devices, each of which relays the data to each of a plurality of proxied devices. The use of proxy devices significantly reduces network overhead. The data transfer is associated with one or more messages having end-to-end security. These messages allow the recipients of the data to confirm the authenticity of the data. In an example, a message having end-to-end security may provide a hash value of all data blocks transferred (without end-to-end security), thereby allowing the proxied device to (upon verification) rely on the data blocks transferred.

A server 402 sends an end-to-end secure message 408 (transmitted via a proxy device 404) to a proxied device 406. The end-to-end secure message 408 is sent with end-to-end security, i.e., the proxy device 404 (and all other network devices) do not have a way of decrypting the end-to-end secure message 408. In an example, the end-to-end secure message 408 may indicate that the server 402 is about to send data to the proxied device 406. In an example, the proxy device 404 relays the end-to-end secure message 408 from the server 402 to each of the plurality of proxied device(s) 406. This may include relaying the end-to-end secured message to each of the plurality of proxied devices in an application layer configured according to a device language message specification (DLMS) and a companion specification for energy metering (COSEM). In a further example, the relaying of the end-to-end secured message to each of the plurality of proxied devices may be performed in an application layer of a network having a star, a mesh, or a cellular configuration.

In an optional validation action 410, the proxy device confirms that the end-to-end secure message 408 was in fact sent by the server 402. In an example, the proxy device examines a signature of the message using the public key of the server 402. By confirming the origin of the end-to-end secure message 408, the proxy device 404 provides additional security to proxied device 406, and additionally prevents a message generated by a bad actor from being forwarded to the proxied device, which would waste network bandwidth and would waste processing power of network devices. The proxied device 406 responds with a secure end-to-end response 412 (sent to the server 402 and transmitted via the proxy device 404) that is protected by end-to-end security (i.e., the message may be decrypted only by the recipient, the server 402). In an example, the secure end-to-end response 412 may indicate that the proxied device 406 understands that it is about to receive data. At repetition action 414, the events (transmission of the end-to-end secure message 408, the optional validation action 410, and transmission of the secure end-to-end response 412) may be repeated a number of times. In an example, if 1000 proxy devices each manage 100 proxied devices, then the server may send end-to-end secure message 408 to each of the 1000 proxy devices, but 100,000 proxied devices will receive the message via their respective proxy device.

The server 402 sends non-end-to-end data 416 (e.g., a firmware update "image," or a script to configure a proxied device, or other data, instructions, etc.) to a proxy device 404. The action of sending non-end-to-end data 416 may be repeated for each of a plurality of proxied devices.

At validation action 418, the proxy device 404 may examine the non-end-to-end data 416 received by the proxy device, and to be relayed by the proxy device 406 as non-end-to-end data 420. In particular, the proxy device may verify, validate and/or confirm: first, if the data was sent by the server 402 (and not a bad actor); and second, a connection between the non-end-to-end data 416 and non-end-to-end data 420 and the end-to-end secure message 408 and secure end-to-end response 412. In an example, the validation may be performed by verifying a signature of the server 402, such as with a public key. Thus, a bad actor is unable to substitute data blocks (e.g., simulate non-end-to-end data 416). In another example, a secret in each data packet (of the non-end-to-end data 416 and non-end-to-end data 420) is used to confirm that those data packets are related to an end-to-end secured message.

During the transfer of the non-end-to-end data 420, each of the proxy devices 404 relays the data to the proxied devices it "manages" and/or with which it is associated. At repetition action 422, the data transferred may be quite large, and sent in a plurality of blocks. Thus transmission of the non-end-to-end data 416 and non-end-to-end data 420, and the validation action 418 may be repeated for each block of data.

The server 402 sends each proxied device 406 a secured end-to-end message 424. The secured end-to-end message 424 may indicate some action that the proxied device should perform with the data received according to non-end-to-end data 416, validation action 418, non-end-to-end data 420, and repetition action 422. At optional verification or validation action 426, each proxy device 404 may verify the identity of the server 402 before forwarding the message to proxied devices with which it is associated. Each proxied device responds to the server with secure end-to-end message 428. At repetition action 430, the transmission of the secure end-to-end message 428, the performance of the optional verification or validation action 426, and transmission of the secure end-to-end message 428, are repeated for each proxied device.

FIG. 5 is a sequence diagram 500 showing an example relationship between server(s), proxy device(s), and proxied device(s), configured to provide a secured configuration distribution via proxy device(s) to a plurality of proxied devices. The configuration distribution may include a script, which when executed, configures settings, states, parameters, etc. of a device. Accordingly, a plurality of proxied devices may be configured (and/or reconfigured) by receiving and executing such scripts. In the example sequence diagram 500, the events or actions may be performed by the server(s) 102, the proxy device(s) 104, and the proxied device(s) 106 seen in FIG. 1.

The server(s) 102 send non-end-to-end secure data 502 (e.g., a script that may be executed to configure settings in a device) to a proxy device 104. In an example, the server(s) 102 sends the data to a plurality of proxy devices. The non-end-to-end secure data 502 (earlier received by the proxy devices 104) is resent as non-end-to-end secure data 504 to each of the proxied devices of each of the proxy device(s). In an example, the data is non-end-to-end secure because it may be read by the proxy device(s) 104. Each proxied device 106 may receive a customized data transfer, or a copy of data sent to many proxied devices. At repetition action 506, if the data requires many packets, then multiple messages may be sent to each proxied device.

A status query 508 is sent by each of the server(s) 102 to their respective proxy device(s) 104. The proxy devices 104 of each server track the status of the transmissions sent to, and received by, each proxy device's proxied devices. A response 510 is sent by each proxy device, as each proxied device reports its status to its server. At repetition action 512, the status query and response may be repeated as needed during the transfer of data and/or upon conclusion of the transfer of the data. An end-to-end secure transmission 514 is sent to each proxied device by each server, a command instructs the proxied device to apply the configuration, i.e., to execute the script that will configure the proxied device's various settings, parameters, variables, etc. The end-to-end secure transmission 516—from each of server to each proxied device 106—is a command that instructs the proxied device to read its configuration, i.e., to execute the script that will determine a revision number, "tag," or other indicator of the status of the configuration. Optional grouping 518 shows that the command to configure the proxied device and the command to read the configuration revision number and/or "tag" could be sent as either one or two commands. The end-to-end secure transmission 514 and end-to-end secure transmission 516 are both configured as messages protected by end-to-end encryption. Accordingly, no intermediate device (e.g., the proxy device or other device) is able to decrypt the commands. Secure end-to-end response 520, the proxied device responds with an end-to-end encrypted message indicating the configuration version number and/or "tag." At repetition action 522, the transmissions, groupings, responses, etc., 514-520 may be repeated until each proxied device has reported its configuration state, version number, and/or "tag."

FIG. 6 is a sequence diagram 600 showing an example relationship between server(s), proxy device(s), and proxied device(s), configured to provide secured "image" distribution via a proxy to a plurality of proxied devices. The "image" distribution includes one or more data files, and may include a firmware, operating system, and/or application update. Accordingly, the "image" can be any data file(s) used by the proxied device(s). In an example, new firmware, operating system, and/or applications may be sent to the proxied device, allowing them to be activated, executed, and/or used in a device re-boot.

At transmission 602, the server(s) sends data to the proxy(s). In an example, each of a plurality of server(s) 102 sends data to each of the server's proxy devices 104. The data may be customized for each proxy device, or it may be the same for some or all proxy devices. Using end-to-end secured transmission 604, the server(s) send a message to each proxied device 106 via each proxied device's respective proxy device 104. The message may indicate that a data transfer is to be initiated, and the message (announcing the data transfer) may be sent with end-to-end security (e.g., encryption). In an example, the end-to-end secured message includes a notification that a firmware update will be sent.

At transmission(s) 606, each server 102 sends a list of proxied devices to each of that server's proxy device(s) 104. In an example, each server from among a plurality of servers sends a list of proxied devices to each of that server's proxy devices. In an example, the list of addresses may include addresses of a plurality of proxied devices associated with each proxy device from among one or more proxy devices. And further, each of the plurality of proxied devices may be a one-, a two-, more-hop neighbor of the proxy device.

At transmission(s) 608, data blocks are sent by the server(s) to their respective proxy device(s) that are associated with one or more devices of the lists of proxied devices. At transmission 610, the proxied devices begin to send the data blocks to the appropriate proxied devices. Each data block can be encrypted, and is part of the "image" to be transmitted to one or more proxied devices. At transmission(s) 612, the proxy devices 104 continue to send data blocks to their respective proxied device(s) 106, as indicated by the list of proxied devices. A status query 614 is sent by the server(s) 102 to their respective proxy devices 104. Transmissions 616 enable the proxy devices to communicate with their respective proxied devices and to thereby determine the status of the data transfer with each proxied device. Transmission 618—sent to the server(s) 102 by each of the servers' respective proxied devices—reports the status information obtained by transmissions 616. In an example, the status is "in progress," "completed," "failed," etc. Transmissions 620 send additional data blocks, which are transferred from the proxy device(s) 104 to the proxied device(s) 106. A status query 622 is sent from server(s) 102 to the proxy device(s) 104. In some examples, the proxy device(s) have a record of the status based on feedback from the proxied devices as the data is transferred. Transmission 624 reports the status—of and from the proxy device(s) 104—to the server(s) 102. At transmission 626, the last block is transferred by a proxy device to a proxied device.

Validation action 628 validates the data if valid. In an example, the data is validated by obtaining a hash value (from the end-to-end secured transmission 604) and comparing the hash value to hashes of the data blocks received (e.g., from transmissions 610, 612, 620, and 626).

A status query 630 is sent by the server(s) 102 to the proxy device(s) 104. Communications 632—between the proxy device(s) and their respective proxied device(s)—obtains status information from each proxied device. The proxy device(s) 104 send status messages 634 to their respective servers, indicating a status of each of the proxied devices of each proxy device.

An end-to-end secured message 636 is sent by each the server to each server's proxy devices'proxied devices. That is, each server sends an end-to-end secured message to the proxied devices of its proxy devices. The message instructs the proxied devices to activate the software of the data transmissions. The message is sent with end-to-end security, preventing intermediate devices from obtaining a decrypted copy of the data. In an example, the end-to-end secured message may be a command to install and execute a firmware update obtained from the data transfer.

At event or action 638, the proxied device(s) activate the data they obtained. The action may be responsive to the end-to-end secured message 636. If the data was firmware or software, the activation includes execution of the firmware or software, possibly including a reboot or restart.

Example Methods

In some examples, the techniques discussed herein may be implemented by one more processors accessing software defined on one or more memory devices. The processor(s) and memory device(s) may be located on an electricity meter and/or a cloud-based server (e.g., a server of a utility company). If the functionality is distributed, software may reside on both the electricity meter and the server.

In other examples of the techniques discussed herein, the methods of operation may be performed by one or more application specific integrated circuits (ASIC) or may be performed by a general-purpose processor utilizing software defined in computer-readable media. The general-purpose processor and the software defined in one or more computer-readable media may be present in one or more of the server(s) 102, the proxy device(s) 104, and/or the proxied device(s) 106. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase-change memory (PRAM), static random-access memory (SRAM), dynamic random-access memory (DRAM), other types of random access memory (RAM), read-only memory (ROM), electrically erasable programmable read-only memory (EEPROM), programmable read-only memory (PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media. Computer-readable media does not include transitory media, such as modulated data signals and carrier waves, and/or other information-containing signals.

Figure 7:
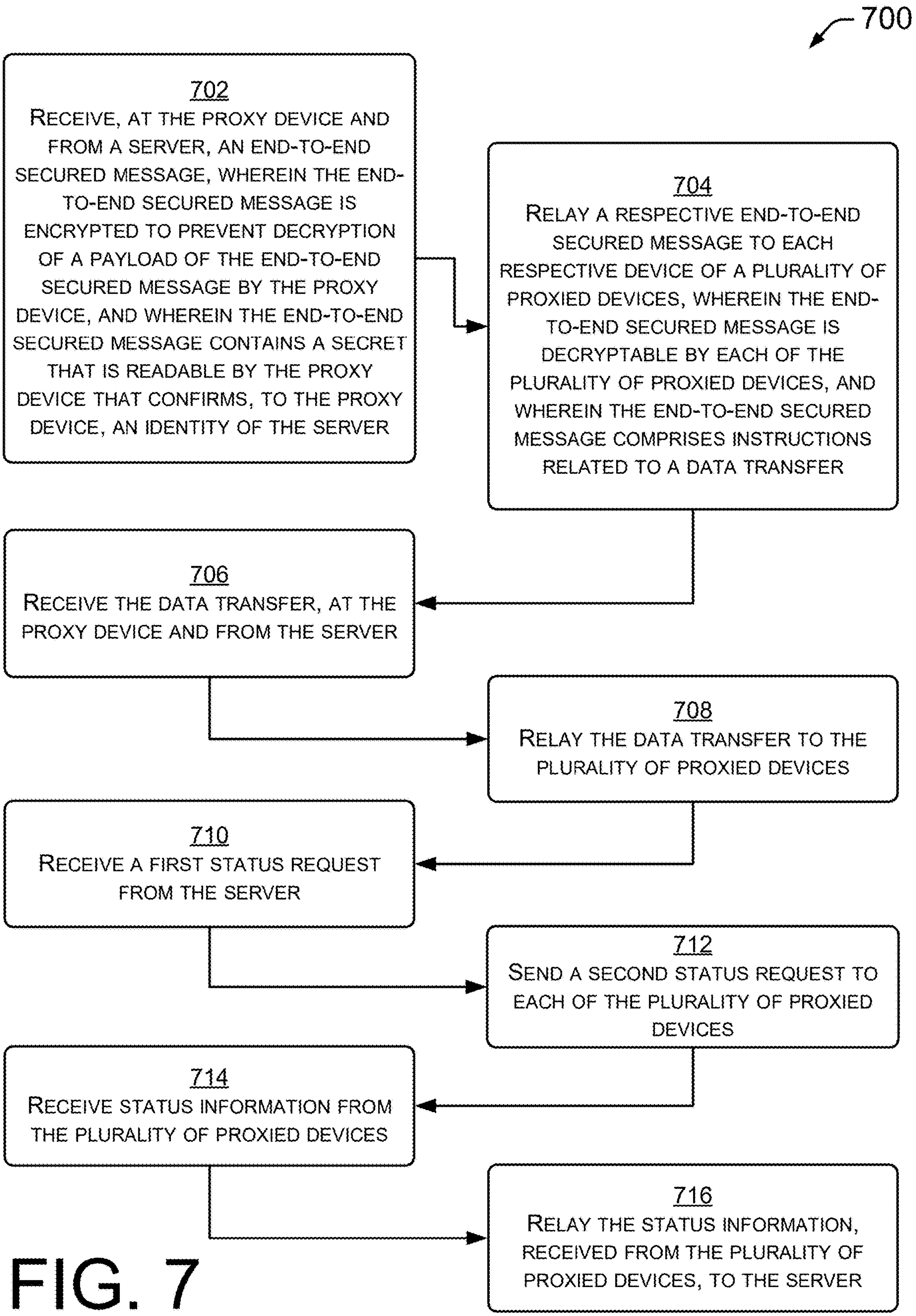
FIG. 7 is a flow diagram showing a first example operation of a proxy device configured for secured proxy data distribution.

FIG. 7 shows a first example operation of a proxy device configured for secured proxy data distribution. At block 702, a proxy device receives (e.g., from a server) an end-to-end secured message. The end-to-end secured message is encrypted to prevent decryption of a payload of the end-to-end secured message by the proxy device (or any other device). In an example, the end-to-end secured message contains a secret that is readable by the proxy device that confirms, to the proxy device, an identity of the server. This prevents a bad actor from masquerading as the server and sending the proxy a message.

At block 704, respective end-to-end secured messages are relayed to each respective device of a plurality of proxied devices. The end-to-end secured messages are decryptable by each of the plurality of proxied devices. The end-to-end secured messages may include instructions related to a data transfer (e.g., that the proxied devices should be ready for a data transfer). In an example, the data transfer is or includes a script. The script may be configured so that execution of the script by a proxied device configures the proxied device to perform activities in a prescribed manner. In another example, the data transfer is or includes a firmware update, wherein execution of the firmware update by a proxied device configures the proxied device to perform activities in a prescribed manner.

At block 706, the data transfer is received at the proxy device, having been sent from the server. In an example, a public key of the server is used to decrypt the secret, and to thereby confirm that the data originated at the server. Thus, even a message that is end-to-end encrypted can be confirmed to be of authentic origin by the proxy device (which is between the server and the proxied device).

At block 708, the data transfer is relayed by the proxy devices to the plurality of proxied devices. In an example related to firmware update and configuration data transfers, the data transfer is relayed to proxied devices included on a list of proxied devices. In a further example, the list of proxied devices was sent by the server and received at the proxy device.

At block 710, a first status request is received (e.g., at the proxy device) from the server. At block 712, a second status request is sent (e.g., by the proxy device(s)) to each of the plurality of proxied devices. At block 714, status information is received (e.g., at the proxy device(s)) from the plurality of proxied devices. At block 716, the status information—received from the plurality of proxied devices—is relayed (e.g., by the proxy device(s)), to the server.

Example Systems, Devices, and Methods

The following examples of Secured Proxy Data Distribution are expressed as numbered clauses. While the examples illustrate a number of possible configurations and techniques, they are not meant to be an exhaustive listing of the systems, methods, and/or techniques described herein.

1. A method of operating a proxy device, comprising: receiving, at the proxy device and from a server, an end-to-end secured message, wherein the end-to-end secured message is encrypted to prevent decryption of a payload of the end-to-end secured message by the proxy device, and wherein the end-to-end secured message contains a secret that is readable by the proxy device that confirms, to the proxy device, an identity of the server; relaying a respective end-to-end secured message to each respective device of a plurality of proxied devices, wherein the end-to-end secured message is decryptable by each of the plurality of proxied devices, and wherein the end-to-end secured message comprises instructions related to a data transfer; receiving the data transfer, at the proxy device and from the server; relaying the data transfer to the plurality of proxied devices; receiving a first status request from the server; sending a second status request to each of the plurality of proxied devices; receiving status information from the plurality of proxied devices; and relaying the status information, received from the plurality of proxied devices, to the server.

2. The method of clause 1, wherein the data transfer comprises: a script, wherein execution of the script by a proxied device configures the proxied device to perform activities in a prescribed manner.

3. The method of clause 1, wherein the data transfer comprises: a firmware update, wherein execution of the firmware update by a proxied device configures the proxied device to perform activities in a prescribed manner.

4. The method of clause 1, additionally comprising: using a public key of the server to decrypt the secret and confirm that the data originated at the server.

5. The method of clause 1, wherein relaying the data transfer to the plurality of proxied devices comprises: sending, by the proxy device to each of the plurality of proxied devices, a plurality of data blocks.

6. The method of clause 1, wherein relaying the data transfer to the plurality of proxied devices comprises: relaying the data transfer to proxied devices included on a list of proxied devices, wherein the list of proxied devices was received from the server.

7. The method of clause 1, additionally comprising: receiving, at the proxy device and from the server, a list of addresses of each of the plurality of proxied devices, wherein each of the plurality of proxied devices is a one-, a two-, more-hop neighbor of the proxy device.

8. The method of clause 1, wherein the end-to-end secured message comprises a notification that a firmware update will be sent.

9. The method of clause 1, wherein the end-to-end secured message comprises a command to install and execute a firmware update obtained from the data transfer.

The method as recited in clause 1, additionally comprising one or more of, or any combination of, or all of, any of the preceding clauses.

10. A proxy device, comprising: a processor; one or more memory devices in communication with the processor; statements, defined in the one or more memory devices, which when executed by the processor cause the proxy device to perform actions comprising: receiving, at the proxy device and from a server, an end-to-end secured message, wherein the end-to-end secured message is encrypted to prevent decryption of a payload of the end-to-end secured message by the proxy device, and wherein the end-to-end secured message contains a secret that is readable by the proxy device that confirms, to the proxy device, an identity of the server; relaying a respective end-to-end secured message to each respective device of a plurality of proxied devices, wherein the end-to-end secured message is decryptable by each of the plurality of proxied devices, and wherein the end-to-end secured message comprises instructions related to a data transfer; receiving the data transfer, at the proxy device and from the server; relaying the data transfer to the plurality of proxied devices; receiving a first status request from the server; sending a second status request to each of the plurality of proxied devices; receiving status information from the plurality of proxied devices; and relaying the status information, received from the plurality of proxied devices, to the server.

11. The proxy device of clause 10, wherein the data transfer comprises: a script, wherein execution of the script by a proxied device configures the proxied device to perform activities in a prescribed manner.

12. The proxy device of clause 10, wherein the end-to-end secured message comprises a command to apply a configuration script obtained from the data transfer and to read a configuration tag.

13. The proxy device of clause 10, wherein the actions additionally comprise: relaying, from each of the plurality of proxied devices to the server, an end-to-end secured message comprising a configuration tag of each respective proxied device.

14. The proxy device of clause 10, wherein relaying the end-to-end secured message to each of the plurality of proxied devices comprises: relaying the end-to-end secured message to each of the plurality of proxied devices in an application layer configured according to a device language message specification (DLMS) and a companion specification for energy metering (COSEM).

15. The proxy device of clause 10, wherein relaying the end-to-end secured message to each of the plurality of proxied devices comprises: relaying the end-to-end secured message to each of the plurality of proxied devices in an application layer of a network configured according to a star, mesh, or cellular configuration.

The proxy device as recited in clause 10, additionally comprising one or more of, or any combination of, or all of, any of the preceding clauses.

16. One or more non-transitory computer-readable media storing computer-executable instructions that, when executed by one or more processors, configure a proxy device to perform actions comprising: receiving, at the proxy device and from a server, an end-to-end secured message, wherein the end-to-end secured message is encrypted to prevent decryption of a payload of the end-to-end secured message by the proxy device, and wherein the end-to-end secured message contains a secret that is readable by the proxy device that confirms, to the proxy device, an identity of the server; relaying a respective end-to-end secured message to each respective device of a plurality of proxied devices, wherein the end-to-end secured message is decryptable by each of the plurality of proxied devices, and wherein the end-to-end secured message comprises instructions related to a data transfer; receiving the data transfer, at the proxy device and from the server; relaying the data transfer to the plurality of proxied devices; receiving a first status request from the server; sending a second status request to each of the plurality of proxied devices; receiving status information from the plurality of proxied devices; and relaying the status information, received from the plurality of proxied devices, to the server.

17. The one or more non-transitory computer-readable media storing computer-executable instructions of clause 16, wherein the data transfer comprises: a script, wherein execution of the script by a proxied device configures the proxied device to perform activities in a prescribed manner.

18. The one or more non-transitory computer-readable media storing computer-executable instructions of clause 16, wherein the data transfer comprises: a firmware update, wherein execution of the firmware update by a proxied device configures the proxied device to perform activities in a prescribed manner.

19. The one or more non-transitory computer-readable media storing computer-executable instructions of clause 16, wherein the actions additionally comprise: using a public key of the server to decrypt the secret and confirm that the data originated at the server.

20. The one or more non-transitory computer-readable media storing computer-executable instructions of clause 16, wherein relaying the data transfer to the plurality of proxied devices comprises: sending, by the proxy device to each of the plurality of proxied devices, a plurality of data blocks.

The one or more non-transitory computer-readable media storing computer-executable instructions as recited in clause 16, additionally comprising one or more of, or any combination of, or all of, any of the preceding clauses.

Conclusion

Although the subject matter has been described in language specific to structural features and/or methodological actions, it is to be understood that the subject matter defined in the appended claims is not necessarily limited to the specific features or actions described. Rather, the specific features and actions are disclosed as exemplary forms of implementing the claims.

The words comprise, comprises, and/or comprising, when used in this specification and/or claims do not preclude the presence or addition of one or more other features, devices, techniques, and/or components and/or groups thereof.

The invention claimed is:

1. A method of operating a proxy device, comprising:

receiving, at the proxy device and from a server, an end-to-end secured message, wherein the end-to-end secured message is encrypted to prevent decryption of a payload of the end-to-end secured message by the proxy device, and wherein the end-to-end secured message contains a secret that is readable by the proxy device that confirms, to the proxy device, an identity of the server;

relaying a respective end-to-end secured message to each respective device of a plurality of proxied devices, wherein the end-to-end secured message is decryptable by each of the plurality of proxied devices, and wherein the end-to-end secured message comprises instructions related to a data transfer;

receiving the data transfer, at the proxy device and from the server;

relaying the data transfer to the plurality of proxied devices;

receiving a first status request from the server;

sending a second status request to each of the plurality of proxied devices;

receiving status information from the plurality of proxied devices; and relaying the status information, received from the plurality of proxied devices, to the server.

2. The method of claim 1, wherein the data transfer comprises:

a script, wherein execution of the script by a proxied device configures the proxied device to perform activities in a prescribed manner.

3. The method of claim 1, wherein the data transfer comprises:

a firmware update, wherein execution of the firmware update by a proxied device configures the proxied device to perform activities in a prescribed manner.

4. The method of claim 1, additionally comprising:

using a public key of the server to decrypt the secret and confirm that the data transfer originated at the server.

5. The method of claim 1, wherein relaying the data transfer to the plurality of proxied devices comprises:

sending, by the proxy device to each of the plurality of proxied devices, a plurality of data blocks.

6. The method of claim 1, wherein relaying the data transfer to the plurality of proxied devices comprises:

relaying the data transfer to proxied devices included on a list of proxied devices, wherein the list of proxied devices was received from the server.

7. The method of claim 1, additionally comprising:

receiving, at the proxy device and from the server, a list of addresses of each of the plurality of proxied devices, wherein each of the plurality of proxied devices is a one-, a two-, more-hop neighbor of the proxy device.

8. The method of claim 1, wherein the end-to-end secured message comprises a notification that a firmware update will be sent.

9. The method of claim 1, wherein the end-to-end secured message comprises a command to install and execute a firmware update obtained from the data transfer.

10. A proxy device, comprising:
a processor;
one or more memory devices in communication with the processor; and
statements, defined in the one or more memory devices, which when executed by the processor cause the proxy device to perform actions comprising:
receiving, at the proxy device and from a server, an end-to-end secured message, wherein the end-to-end secured message is encrypted to prevent decryption of a payload of the end-to-end secured message by the proxy device, and wherein the end-to-end secured message contains a secret that is readable by the proxy device that confirms, to the proxy device, an identity of the server;
relaying a respective end-to-end secured message to each respective device of a plurality of proxied devices, wherein the end-to-end secured message is decryptable by each of the plurality of proxied devices, and wherein the end-to-end secured message comprises instructions related to a data transfer;
receiving the data transfer, at the proxy device and from the server;
relaying the data transfer to the plurality of proxied devices;
receiving a first status request from the server;
sending a second status request to each of the plurality of proxied devices;
receiving status information from the plurality of proxied devices; and
relaying the status information, received from the plurality of proxied devices, to the server.

11. The proxy device of claim 10, wherein the data transfer comprises:
a script, wherein execution of the script by a proxied device configures the proxied device to perform activities in a prescribed manner.

12. The proxy device of claim 10, wherein the end-to-end secured message comprises a command to apply a configuration script obtained from the data transfer and to read a configuration tag.

13. The proxy device of claim 10, wherein the actions additionally comprise:
relaying, from each of the plurality of proxied devices to the server, an end-to-end secured message comprising a configuration tag of each respective proxied device.

14. The proxy device of claim 10, wherein relaying the end-to-end secured message to each of the plurality of proxied devices comprises:
relaying the end-to-end secured message to each of the plurality of proxied devices in an application layer configured according to a device language message specification (DLMS) and a companion specification for energy metering (COSEM).

15. The proxy device of claim 10, wherein relaying the end-to-end secured message to each of the plurality of proxied devices comprises:
relaying the end-to-end secured message to each of the plurality of proxied devices in an application layer of a network configured according to a star, mesh, or cellular configuration.

16. One or more non-transitory computer-readable media storing computer-executable instructions that, when executed by one or more processors, configure a proxy device to perform actions comprising:
receiving, at the proxy device and from a server, an end-to-end secured message, wherein the end-to-end secured message is encrypted to prevent decryption of a payload of the end-to-end secured message by the proxy device, and wherein the end-to-end secured message contains a secret that is readable by the proxy device that confirms, to the proxy device, an identity of the server;
relaying a respective end-to-end secured message to each respective device of a plurality of proxied devices, wherein the end-to-end secured message is decryptable by each of the plurality of proxied devices, and wherein the end-to-end secured message comprises instructions related to a data transfer;
receiving the data transfer, at the proxy device and from the server;
relaying the data transfer to the plurality of proxied devices;
receiving a first status request from the server;
sending a second status request to each of the plurality of proxied devices;
receiving status information from the plurality of proxied devices; and
relaying the status information, received from the plurality of proxied devices, to the server.

17. The one or more non-transitory computer-readable media storing computer-executable instructions of claim 16, wherein the data transfer comprises:
a script, wherein execution of the script by a proxied device configures the proxied device to perform activities in a prescribed manner.

18. The one or more non-transitory computer-readable media storing computer-executable instructions of claim 16, wherein the data transfer comprises:
a firmware update, wherein execution of the firmware update by a proxied device configures the proxied device to perform activities in a prescribed manner.

19. The one or more non-transitory computer-readable media storing computer-executable instructions of claim 16, wherein the actions additionally comprise:
using a public key of the server to decrypt the secret and confirm that the data transfer originated at the server.

20. The one or more non-transitory computer-readable media storing computer-executable instructions of claim 16, wherein relaying the data transfer to the plurality of proxied devices comprises:
sending, by the proxy device to each of the plurality of proxied devices, a plurality of data blocks.

* * * * *